US012671764B2

(12) United States Patent
Thakare et al.

(10) Patent No.: US 12,671,764 B2
(45) Date of Patent: Jun. 30, 2026

(54) SYSTEM AND METHOD FOR RE-SKILLING AGENTS SKILLS IN AN AUTOMATIC CALL DISTRIBUTOR (ACD) APPLICATION DUE TO A REQUEST OF CHANGE TO A SCHEDULED-SHIFT OF AN AGENT

(71) Applicant: NICE LTD., Ra'anana (IL)

(72) Inventors: Swapnil Thakare, Pune (IN); Gaurav Suryawanshi, Pune (IN); Disha Agrawal, Pune (IN)

(73) Assignee: NICE LTD., Ra'anana (IL)

( * ) Notice: Subject to any disclaimer, the term of this patent is extended or adjusted under 35 U.S.C. 154(b) by 138 days.

(21) Appl. No.: 18/664,318

(22) Filed: May 15, 2024

(65) Prior Publication Data

US 2025/0358368 A1    Nov. 20, 2025

(51) Int. Cl.
| | |
|---|---|
| *H04M 3/523* | (2006.01) |
| *G06Q 10/0631* | (2023.01) |
| *G06Q 10/0637* | (2023.01) |
| *H04M 3/51* | (2006.01) |

(52) U.S. Cl.
CPC .. *H04M 3/5233* (2013.01); *G06Q 10/063112* (2013.01); *G06Q 10/063116* (2013.01); *G06Q 10/06375* (2013.01); *H04M 3/5175* (2013.01); *H04M 2203/402* (2013.01)

(58) Field of Classification Search
CPC ..... H04M 3/523; H04M 3/51; G06Q 10/0631
USPC ......................................... 379/265.12; 705/8
See application file for complete search history.

(56) References Cited

U.S. PATENT DOCUMENTS

| | | | | |
|---|---|---|---|---|
| 7,499,869 | B2 * | 3/2009 | Iknoian .......... | G06Q 10/063116 705/7.21 |
| 9,679,265 | B1 * | 6/2017 | Schwartz ........... | G06Q 10/1093 |
| 11,201,964 | B2 * | 12/2021 | Paiva .................... | G06F 3/0482 |
| 11,736,615 | B2 * | 8/2023 | Stepanov ............ | H04M 3/5233 379/266.01 |
| 2008/0075268 | A1 * | 3/2008 | Medina ............... | H04M 3/5175 379/265.06 |
| 2016/0088153 | A1 * | 3/2016 | Wicaksono ........... | H04M 3/523 379/265.06 |
| 2017/0330147 | A1 * | 11/2017 | Hook ................... | G06Q 10/101 |

* cited by examiner

*Primary Examiner* — Ahmad F. Matar
(74) *Attorney, Agent, or Firm* — SOROKER NORDMAN RIBA

(57) ABSTRACT

A computerized-method for managing skills in an ACD-application due to a request of change to a scheduled-shift of an agent. The computerized-method includes: (i) receiving the request; (ii) retrieving all skills associated to the agent; (iii) for each skill, retrieving mapped ACD-skills and a corresponding SLA-threshold; for each ACD-skill: a. predicting an impact-level on the corresponding SLA-threshold; b. when the predicted impact-level of the ACD-skill is positive, selecting a different-agent that is assigned to the time-interval and activating the ACD-skill of the different-agent, and deactivating all other ACD-skills of the different-agent, to mitigate the ACD-skill corresponding SLA-threshold, and setting the predicted impact-level of the ACD-skill as negative, (iv) when the predicted impact-level of each ACD-skill is negative, granting the request and changing the scheduled-shift based on the request; and (v) configuring the ACD-application to route inbound-interactions to the different-agent based on the activated ACD-skill of each different-agent during the time-interval.

10 Claims, 14 Drawing Sheets

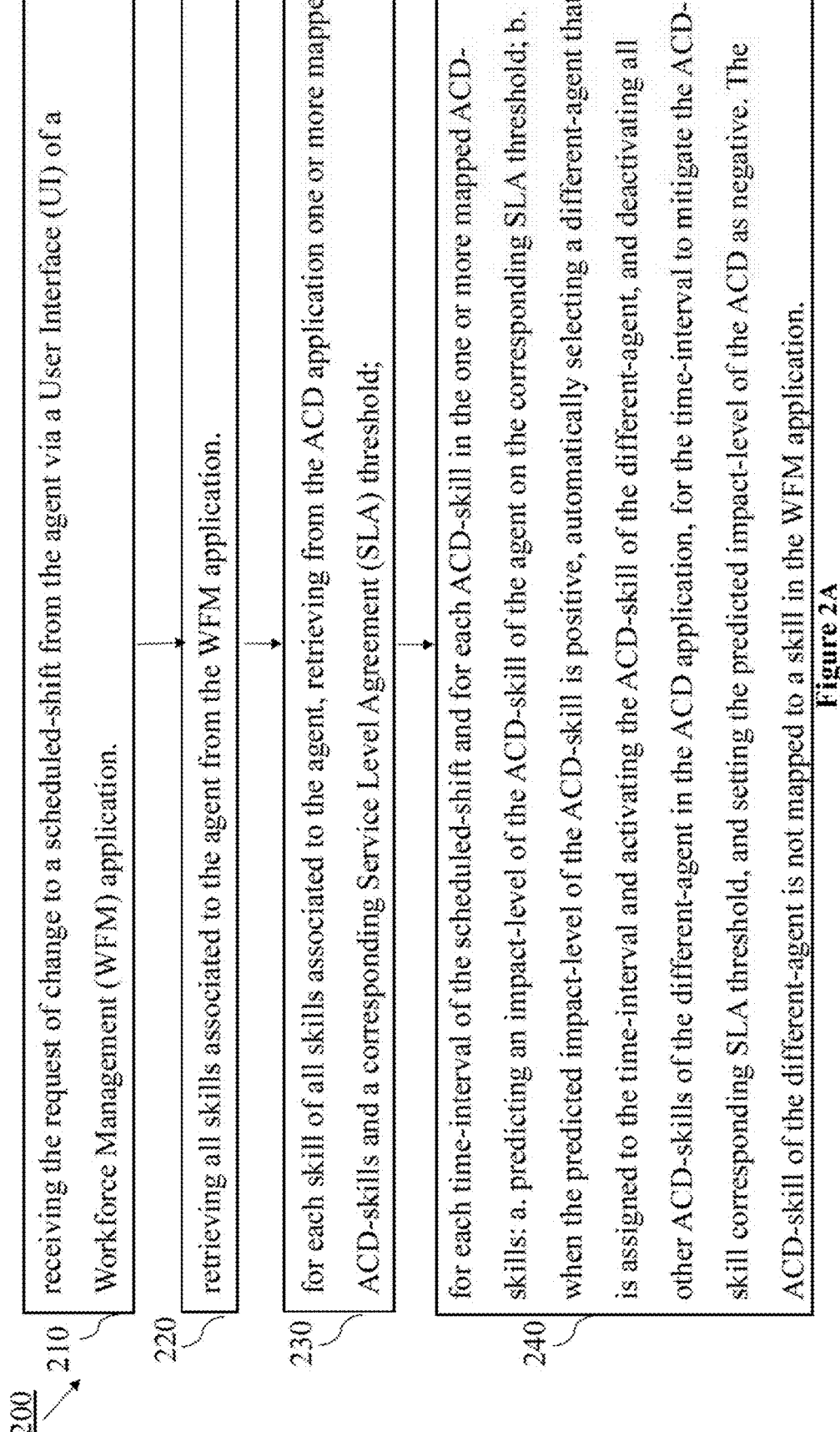

200

210 receiving the request of change to a scheduled-shift from the agent via a User Interface (UI) of a Workforce Management (WFM) application.

220 retrieving all skills associated to the agent from the WFM application.

230 for each skill of all skills associated to the agent, retrieving from the ACD application one or more mapped ACD-skills and a corresponding Service Level Agreement (SLA) threshold;

240 for each time-interval of the scheduled-shift and for each ACD-skill in the one or more mapped ACD-skills: a. predicting an impact-level of the ACD-skill of the agent on the corresponding SLA threshold; b. when the predicted impact-level of the ACD-skill is positive, automatically selecting a different-agent that is assigned to the time-interval and activating the ACD-skill of the different-agent, and deactivating all other ACD-skills of the different-agent in the ACD application, for the time-interval to mitigate the ACD-skill corresponding SLA threshold, and setting the predicted impact-level of the ACD as negative. The ACD-skill of the different-agent is not mapped to a skill in the WFM application.

Figure 2A

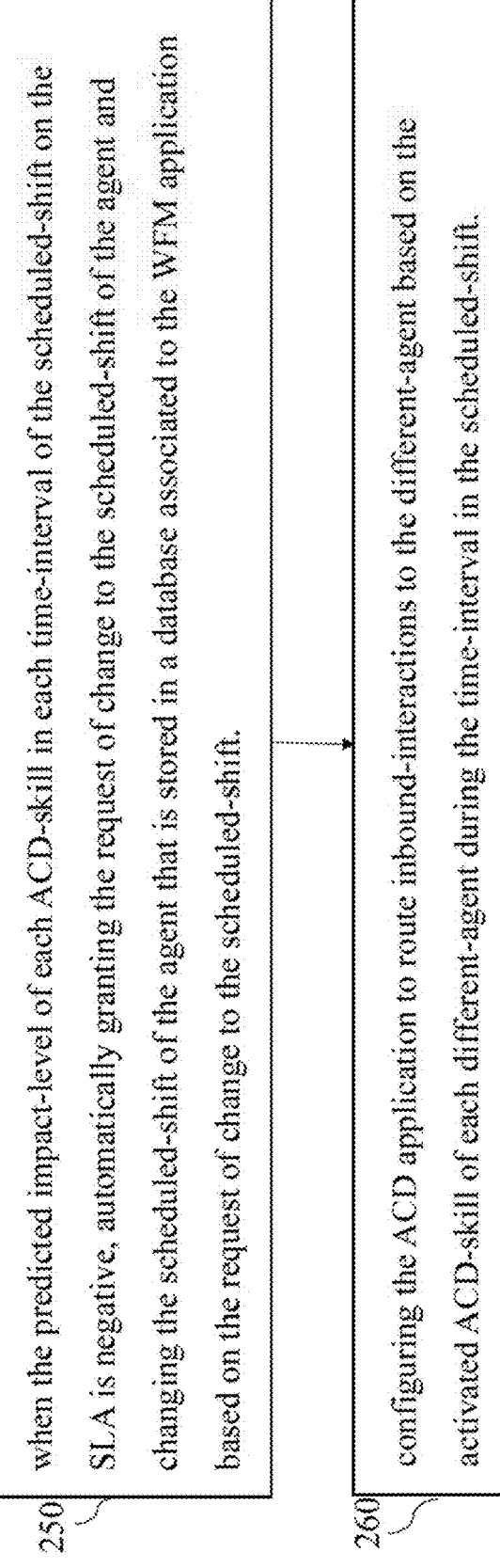

250 when the predicted impact-level of each ACD-skill in each time-interval of the scheduled-shift on the SLA is negative, automatically granting the request of change to the scheduled-shift of the agent and changing the scheduled-shift of the agent that is stored in a database associated to the WFM application based on the request of change to the scheduled-shift.

260 configuring the ACD application to route inbound-interactions to the different-agent based on the activated ACD-skill of each different-agent during the time-interval in the scheduled-shift.

SYSTEM AND METHOD FOR RE-SKILLING AGENTS SKILLS IN AN AUTOMATIC CALL DISTRIBUTOR (ACD) APPLICATION DUE TO A REQUEST OF CHANGE TO A SCHEDULED-SHIFT OF AN AGENT

COPYRIGHT NOTICE

TECHNICAL FIELD

The present disclosure relates to the field of data processing, and more specifically, to method and system for managing skills in an Automatic Call Distributor (ACD) application due to a request of change to a scheduled-shift of an agent.

BACKGROUND

In contact centers, a Workforce Management (WFM) application is a workforce management system which involves multiple processes such as staffing, scheduling, and time-off management. The process of staffing involves predicting the number of interactions for each skill in a set of skills during a specified time-interval, such as 15 mins duration. Based on the staffing requirements, e.g., predicted number of interactions for each skill, schedules are generated for each agent and associated one or more skills. Accordingly, each agent is configured with a set of skills in the WFM application and based on mapped one or more ACD-skills, the ACD application is routing interactions to the agent.

However, an agent is entitled to request a change in a scheduled-shift, e.g., a partial or full day off when the agent is scheduled on a particular day. The supervisor has provision to manage the configured skills for the agents.

In the contact center, there is a Key Performance Indicator (KPI) for each skill that is required for an interaction by using a metric such as Service Level Agreement (SLA), which is a time duration within which the agent is expected to attend a call. If the SLA for a skill is high, it indicates, that the agent that is having the skill is busy with other interactions. In such cases, a user, such as the supervisor, deactivates other skills for the agent to make the agent available for the skill that is having the high SLA or if this skill is deactivated it will be activated.

Whenever there is a request of change to a scheduled-shift from an agent, such as time-off request, it is likely to impact the SLA of the forecasted interactions and the staffing plan. In contact centers, the WFM manager typically receives multiple requests for time-off and shift trading from agents after the schedule has been generated and published.

There may be an impact of time-off requests or shift trade requests on the SLA that is not visible to the manager before approving or refusing these requests. For example, the impact may be that in some cases, such actions may result in under-staffing during a scheduled-shift in the contact center for certain skills causing these skills to experience high wait times and falling out of desired Service Level Agreement (SLA).

In existing systems in contact centers, if such a situation occurs, supervisors manually activate or deactivate skills manually in the Automatic Call Distribution (ACD) application, based on real time SLA that is displayed on a dashboard which requires supervisors to keep a close watch on skills and SLA display via the dashboard, thereby reducing their productivity or availability for other tasks.

Therefore, when a manager receives a time-off request or a shift-trade request, there is a need for a technical solution that will display the impact of the request on the SLA of each skill of the agent for the scheduled shift, considering that the request is approved. Furthermore, there is a need for a technical solution to assess the impact of the time-off request or a shift-trade request, based on time-intervals, where the time-off requests have an impact on staffing and based on identified skills, such that the skills fall out of SLA due to the change that may result due to the result of the request approval.

Additionally, there is a need for a technical solution that will recommend actions or automatically take actions to mitigate the situation of falling out of SLA, such as activating the impacted skills for agents who work on the same scheduled-shift but have the impacted skills deactivated during a time-interval or more in the scheduled-shift.

SUMMARY

There is thus provided, in accordance with some embodiments of the present disclosure, a computerized-method for managing skills in an Automatic Call Distributor (ACD) application due to a request of change to a scheduled-shift of an agent.

Furthermore, in accordance with some embodiments of the present disclosure, the computerized-method nay include: (i) receiving the request of change to a scheduled-shift from the agent via a User Interface (UI) of a Workforce Management (WFM) application; (ii) retrieving all skills associated to the agent from the WFM application; (iii) for each skill of all skills associated to the agent, retrieving from the ACD application one or more mapped ACD-skills and a corresponding Service Level Agreement (SLA) threshold; (iv) for each time-interval of the scheduled-shift: for each ACD-skill in the one or more mapped ACD-skills: a. predicting an impact-level of the ACD-skill of the agent on the corresponding SLA threshold; b. when the predicted impact-level of the ACD-skill is positive, automatically selecting a different-agent that is assigned to the time-interval and activating the ACD-skill of the different-agent, and deactivating all other ACD-skills of the different-agent in the ACD application, for the time-interval to mitigate the ACD-skill corresponding SLA threshold, and setting the predicted impact-level of the ACD as negative. The ACD-skill of the different-agent is not mapped to a skill in the WFM application; (v) when the predicted impact-level of each ACD-skill in each time-interval of the scheduled-shift on the SLA is negative, automatically granting the request of change to the scheduled-shift of the agent and changing the scheduled-shift of the agent that is stored in a database associated to the WFM application based on the request of change to the scheduled-shift; and (vi) configuring the ACD application to route inbound-interactions to the different-agent based on the activated ACD-skill of each different-agent during the time-interval in the scheduled-shift.

Furthermore, in accordance with some embodiments of the present disclosure, the request of change to a scheduled-shift of an agent may include at least one of: (i) time-off request; and (ii) shift-trade request.

3

Furthermore, in accordance with some embodiments of the present disclosure, the SLA threshold may be an Average Time to Answer (ATA) in a preconfigured percentage of inbound interactions.

Furthermore, in accordance with some embodiments of the present disclosure, the predicting impact-level of the ACD-skill on the corresponding SLA threshold may include: (i) determining that the predicted impact-level is negative when a number of agents which are scheduled to the time-interval and assigned the ACD-skill is equal or higher than required staffing level to mitigate the corresponding SLA threshold; and (ii) determining that the impact-level is positive when the number of agents which are scheduled to the time-interval and assigned the ACD-skill is lower than required staffing level to mitigate the corresponding SLA threshold.

Furthermore, in accordance with some embodiments of the present disclosure, when there is no different-agent that has been automatically selected to mitigate the ACD-skill corresponding SLA threshold, the request of change to the scheduled-shift of the agent is denied and said computerized-method further comprising sending a deny-notification to the agent.

Furthermore, in accordance with some embodiments of the present disclosure, the computerized-method may further include configuring the UI of the WFM application to display: (i) the request of change to the scheduled-shift and one or more time-intervals in marked format when the predicted impact-level of at least one ACD-skill is positive; (ii) the selected different-agent for each ACD-skill of the at least one ACD-skill that the predicted impact-level is positive; and (iii) upon receiving via the UI of the WFM a user selection of an approval icon, automatically granting the request of change to the scheduled-shift of the agent and changing the scheduled-shift of the agent that is stored in a database associated to the WFM application based on the request of change to the scheduled-shift.

Furthermore, in accordance with some embodiments of the present disclosure, the automatically selecting of the different-agent may be operated by checking each agent that may be assigned to the time-interval and available if the ACD-skill is deactivated and all activated ACD-skills of the agent have negative predicted impact-level and selecting the agent as the different-agent.

Furthermore, in accordance with some embodiments of the present disclosure, the computerized-method may further include checking that the predicted impact-level of all other ACD-skills of the different-agent during the time-interval in the scheduled-shift is negative.

Furthermore, in accordance with some embodiments of the present disclosure, when the predicted impact-level of the ACD-skill is positive, the computerized-method may further include automatically selecting a different-agent that is assigned to the time-interval and activating the ACD-skill of the different-agent, and deactivating one or more other ACD-skills of the different-agent, which have negative impact-level, in the ACD application, for the time-interval to mitigate the ACD-skill corresponding SLA threshold, and setting the predicted impact-level of the ACD-skill as negative.

There is further provided, in accordance with some embodiments of the present disclosure, a computerized-system for managing skills in an Automatic Call Distributor (ACD) due to a request of change to a scheduled-shift of an agent.

Furthermore, in accordance with some embodiments of the present disclosure, the computerized-system may include one or more processors, the one or more processors may be configured to: (i) receive the request of change to a scheduled-shift from the agent via a User Interface (UI) of a Workforce Management (WFM) application; (ii) retrieve all skills associated to the agent from the WFM application; (iii) for each skill of all skills associated to the agent, retrieving from the ACD application one or more mapped ACD-skills and a corresponding Service Level Agreement (SLA) threshold; (iv) for each time-interval of the scheduled-shift: for each ACD-skill in the one or more mapped ACD-skills: a. predict an impact-level of the ACD-skill of the agent on the corresponding SLA threshold; b. when the predicted impact-level of the ACD-skill is positive, automatically selecting a different-agent that is assigned to the time-interval and activating the ACD-skill of the different-agent, and deactivating all other ACD-skills of the different-agent in the ACD application, for the time-interval to mitigate the ACD-skill corresponding SLA threshold, and setting the predicted impact-level of the ACD-skill as negative. The ACD-skill of the different-agent is not mapped to a skill in the WFM application; (v) when the predicted impact-level of each ACD-skill in each time-interval of the scheduled-shift on the SLA is negative, automatically granting the request of change to the scheduled-shift of the agent and changing the scheduled-shift of the agent that is stored in a database associated to the WFM application based on the request of change to the scheduled-shift; and (vi) configure the ACD application to route inbound-interactions to the different-agent based on the activated ACD-skill of each different-agent during the time-interval in the scheduled-shift.

BRIEF DESCRIPTION OF THE DRAWINGS

FIGS. 2A-2B are a high-level workflow of a module for managing skills in an ACD application due to a request of change to a scheduled-shift of an agent, in accordance with some embodiments of the present disclosure;

FIGS. 6A-6B are screenshots of a User Interface (UI) for a request of a change to a scheduled-shift of an agent, in accordance with some embodiments of the present disclosure.

DETAILED DESCRIPTION

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Currently, since the impact of a request of change to a scheduled-shift of an agent on the SLA is not known, it leads to deviation in the staffing plans. As a result, supervisors must manually track the out of SLA scenarios and manage each skill for the agent.

Therefore, there is a need for a technical solution for automatically predicting the impact of the request of change to the scheduled-shift of an agent on the SLA. There is further a need for a technical solution that will provide recommendations for activation and deactivation of other agents or automatically operate the corrective actions on the schedule base.

Furthermore, there is a need for method and system for managing skills in an Automatic Call Distributor (ACD) application due to a request of change to a scheduled-shift of an agent.

Figure 1A:
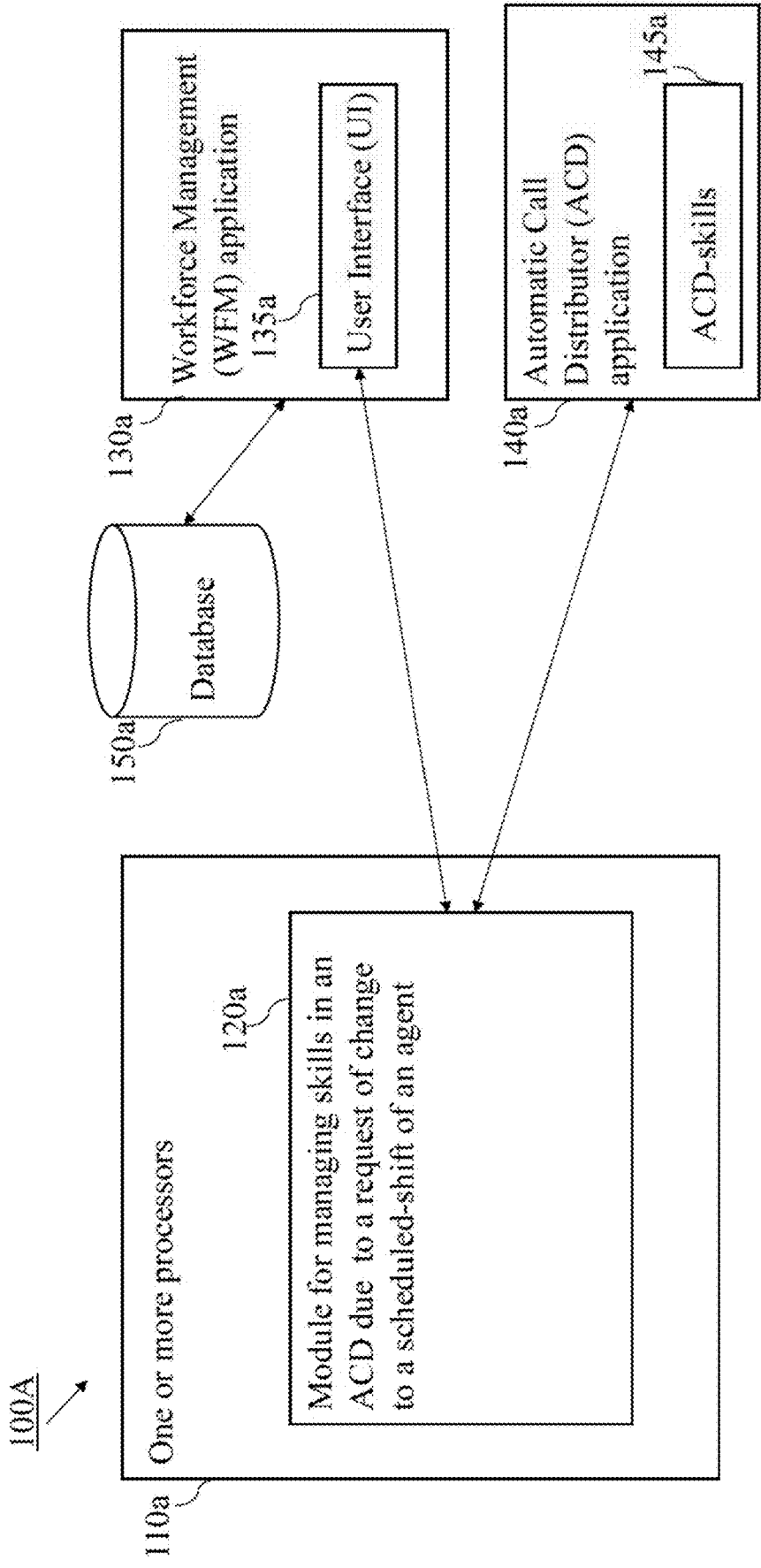
FIGS. 1A-1B schematically illustrate a high-level diagram of a system for managing skills in an Automatic Call Distributor (ACD) application due to a request of change to a scheduled-shift of an agent, in accordance with some embodiments of the present disclosure.

FIG. 1A schematically illustrates a high-level diagram of a system 100A for managing skills in an Automatic Call Distributor (ACD) application due to a request of change to a scheduled-shift of an agent, in accordance with some embodiments of the present disclosure.

According to some embodiments of the present disclosure, a system, such as system 100A may enable managing skills in an Automatic Call Distributor (ACD) application 140a, due to a request of change to a scheduled-shift of an agent by automatically granting the request of change to the scheduled-shift of the agent and changing the scheduled-shift of the agent that is stored in a database 150a that is associated to the WFM application, based on the request of change to the scheduled-shift, when the predicted impact-level of each ACD-skill in each time-interval of the scheduled-shift on the SLA is negative.

According to some embodiments of the present disclosure, system 100A by analyzing each schedule change request of the agent, may generate a mitigation plan tailored to address potential impacts on SLAs related to skills of the agent. The plan may offer proactive strategies to mitigate any adverse effects on service levels, ensuring efficient workforce management and maintaining high-quality service delivery. Thus, anticipating and addressing scheduling challenges effectively, minimizing disruptions and optimizing operational performance.

According to some embodiments of the present disclosure, system 100A may provide available "re-skill" options to a user based on forecasted interactions volume, available agents in a scheduled-shift and their activated skills in the WFM application 130a and the ACD application 140a. If there are agents in the scheduled-shift who can be reskilled without impacting SLA of other skills, then system 100A may automatically approve the request or alternatively may recommend approving the request along with suggested changes.

According to some embodiments of the present disclosure, system 100A may automatically deny the request of change to the scheduled-shift of the agent or recommend against approving the request, when there are no available re-skill options in the affected time-interval to mitigate the impact on the SLA threshold.

According to some embodiments of the present disclosure, system 100A may automatically deny the request or recommend against approving the request when the re-skill action may adversely affect SLA threshold of other skills. The request of change to the scheduled-shift of the agent may be during an ongoing scheduled-shift or for a future scheduled-shift and the automatic reskill may be in current scheduled-shift or in a future scheduled-shift.

According to some embodiments of the present disclosure, a module, such as module for managing skills in an ACD due to a request of change to a scheduled-shift of an agent 120a, may be implemented as a feature in WFM application 130a.

According to some embodiments of the present disclosure, one ore more processors 110a may operate the module for managing skills in an ACD due to a request of change to a scheduled-shift of an agent 120a. The module for managing skills in an ACD due to a request of change to a scheduled-shift of an agent 120a may implement a module, such as module 200 in FIGS. 2A-2B for managing skills in an ACD application due to a request of change to a scheduled-shift of an agent.

According to some embodiments of the present disclosure, system 100A may manage skills in the ACD application 140a due to a request of change to a scheduled-shift of an agent by receiving the request of change to a scheduled-shift from the agent via a User Interface (UI) 135a of the WFM application 130a and then retrieving all skills associated to the agent from the WFM application 130a. The request of change to the scheduled-shift of the agent may be one of time-off request; and shift-trade request.

According to some embodiments of the present disclosure, for each skill of all skills associated to the agent, one or more mapped ACD-skills 145a may be retrieved from the ACD application 140a and a corresponding Service Level Agreement (SLA) threshold. The SLA threshold may be an Average Time to Answer (ATA) in a preconfigured percentage of inbound interactions.

According to some embodiments of the present disclosure, for each time-interval of the scheduled-shift and for each ACD-skill in the one or more mapped ACD-skills, an impact-level of the ACD-skill of the agent on the corresponding SLA threshold may be predicted and then when the predicted impact-level of the ACD-skill is positive, automatically selecting a different-agent that is assigned to the time-interval and activating the ACD-skill of the different-agent, and deactivating all other ACD-skills of the different-agent in the ACD application 140*a*, for the time-interval to mitigate the ACD-skill corresponding SLA threshold, and setting the predicted impact-level of the ACD-skill as negative. The ACD-skill of the different-agent is not mapped to a skill in the WFM application 130*a*.

According to some embodiments of the present disclosure, the automatically selecting of the different-agent may be operated in system 100A by checking each agent that is assigned to the time-interval and available if the ACD-skill is deactivated and all activated ACD-skills of the agent have negative predicted impact-level and selecting the agent as the different-agent.

According to some embodiments of the present disclosure, the impact-level of the ACD-skill on the corresponding SLA threshold may be predicted by determining that the predicted impact-level is negative when a number of agents which are scheduled to the time-interval and assigned the ACD-skill is equal or higher than required staffing level to mitigate the corresponding SLA threshold, and determining that the impact-level is positive when the number of agents which are scheduled to the time-interval and assigned the ACD-skill is lower than required staffing level to mitigate the corresponding SLA threshold.

According to some embodiments of the present disclosure, when the predicted impact-level of each ACD-skill in each time-interval of the scheduled-shift on the SLA is negative, automatically granting the request of change to the scheduled-shift of the agent and changing the scheduled-shift of the agent that is stored in a database associated to the WFM application 150*a* based on the request of change to the scheduled-shift.

According to some embodiments of the present disclosure, the predicted impact-level of all other ACD-skills of the different-agent during the time-interval in the scheduled-shift may be checked that it is negative.

According to some embodiments of the present disclosure, the ACD application 140*a* may be configured to route inbound-interactions to the different-agent based on the activated ACD-skills of each different-agent during the time-interval in the scheduled-shift.

According to some embodiments of the present disclosure, when there is no different-agent that has been automatically selected to mitigate the ACD-skill corresponding SLA threshold, system 100A may deny the request of change to the scheduled-shift of the agent and send a deny-notification to the agent. The deny-notification may be presented via the UI of the WFM on a computerized-device of the agent with an optional click-button for the agent to send another request.

According to some embodiments of the present disclosure, system 100A may have the UI of the WFM application 135*a* configured to display the request of change to the scheduled-shift and one or more time-intervals in marked format when the predicted impact-level of at least one ACD-skill is positive. The UI of the WFM application 135*a* configured to display the selected different-agent for each ACD-skill of the at least one ACD-skill that the predicted impact-level is positive.

According to some embodiments of the present disclosure, upon receiving via the UI of the WFM 135*a* a user selection of an approval icon, system 100A may automatically grant the request of change to the scheduled-shift of the agent and may change the scheduled-shift of the agent that is stored in a database associated to the WFM application 150*a* based on the request of change to the scheduled-shift.

According to some embodiments of the present disclosure, optionally, a grant notification of the request may be sent to the agent and may be displayed via the UI of the WFM application 135*a* on the computerized-device of the agent.

According to some embodiments of the present disclosure, when the predicted impact-level of the ACD-skill is positive, a different-agent that is assigned to the time-interval may be automatically selected and the ACD-skill of the different-agent may be activated, and one or more other ACD-skills of the different-agent, which have negative impact-level, may be deactivated in the ACD application, for the time-interval to mitigate the ACD-skill corresponding SLA threshold. Then, the predicted impact-level of the ACD-skill may be set as negative.

According to some embodiments of the present disclosure, system 100A may be implemented in a Contact Center as a Service (CCaaS) system which contains multiple cross-suite applications such as ACD application 140*a* and WFM application 130*a*. As such, it may be hosted on a cloud computing service provider, e.g., Amazon Web Service (AWS) and may serve as a data source.

According to some embodiments of the present disclosure, the ACD application 140*a* may be a Java-based service used to store ACD-skills data 145*a* and their corresponding SLA threshold. The WFM application 130*a* may be a java-based service which stores the staffing and forecast data, i.e., net-staffing. An admin applications (not shown) which may be a java application, may store the relation of agent and ACD-skills 145*a*, WFM and ACD-skill data.

According to some embodiments of the present disclosure, optionally, the request of change to the scheduled-shift of the agent may be a trade request between the agent and another agent. If the trade-request is between agents with same skills, the analysis of the impact on SLA may not be required. Otherwise, the module for managing skills in an ACD due to a request of change to a scheduled-shift of an agent 120*a* may be executed for schedule-change of both the agents.

Figure 1B:
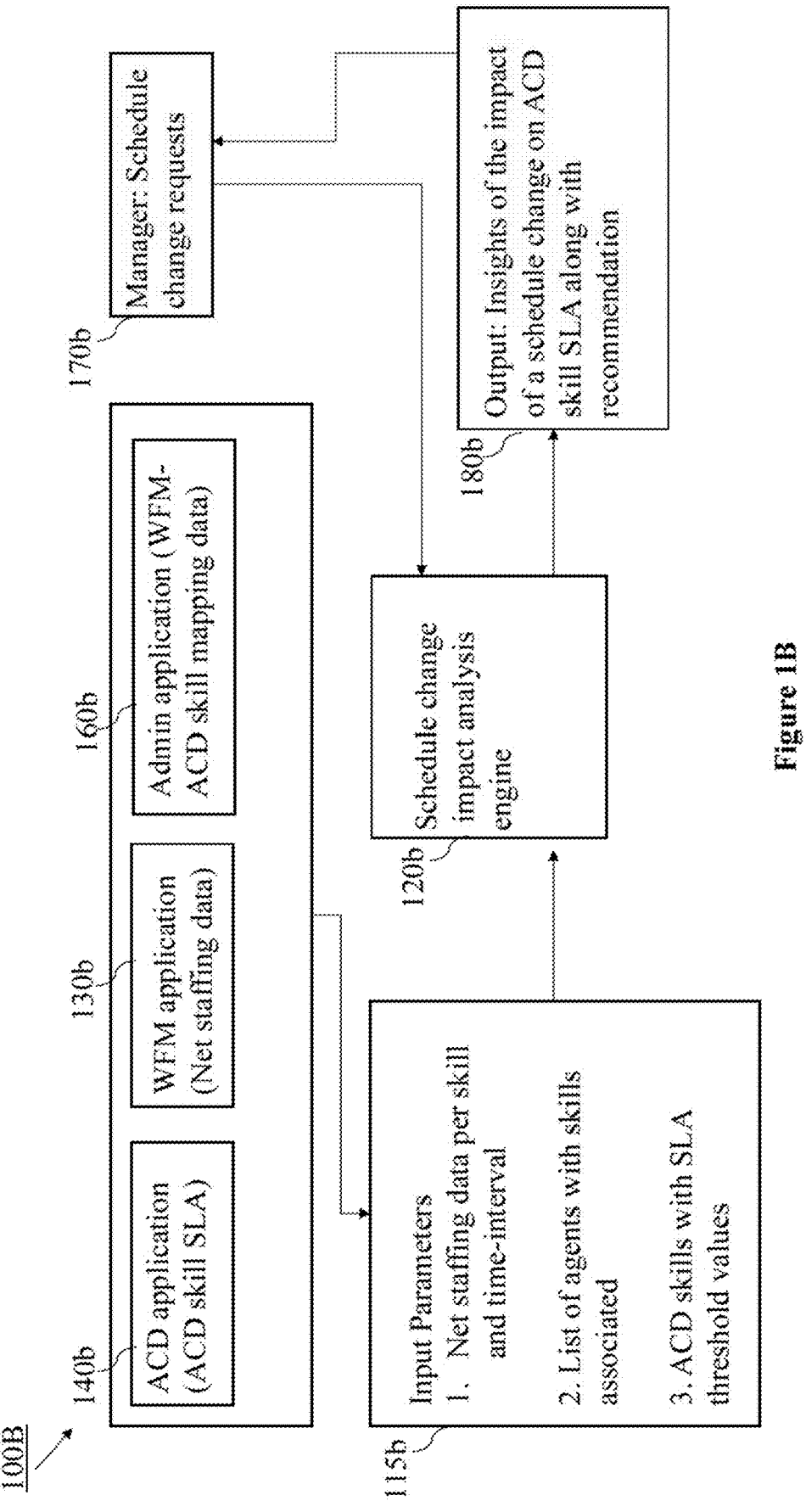

FIG. 1B schematically illustrates a high-level diagram of a system 100B for managing skills in an Automatic Call Distributor (ACD) application due to a request of change to a scheduled-shift of an agent, in accordance with some embodiments of the present disclosure.

Figure 6A:
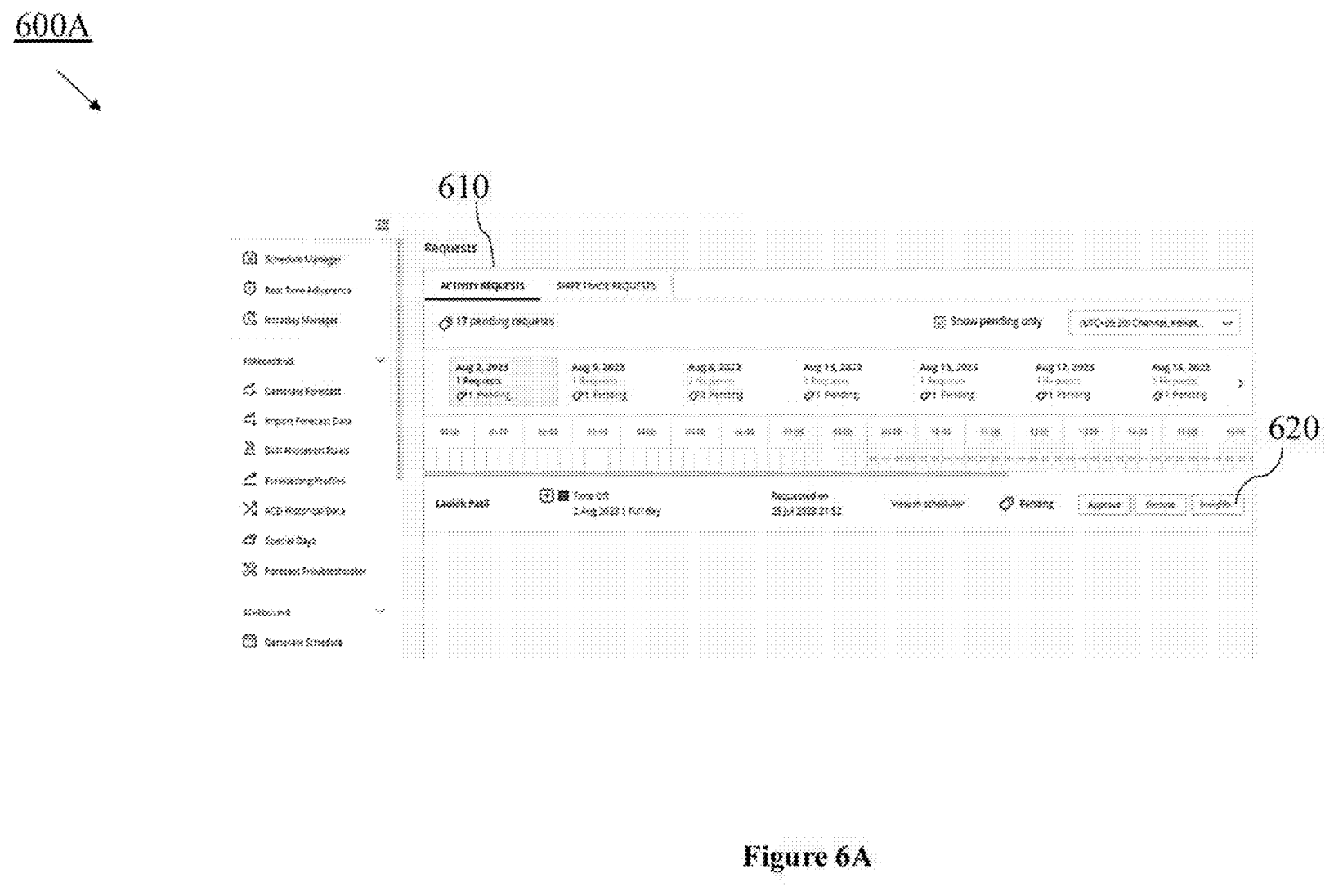
Figure 6B:
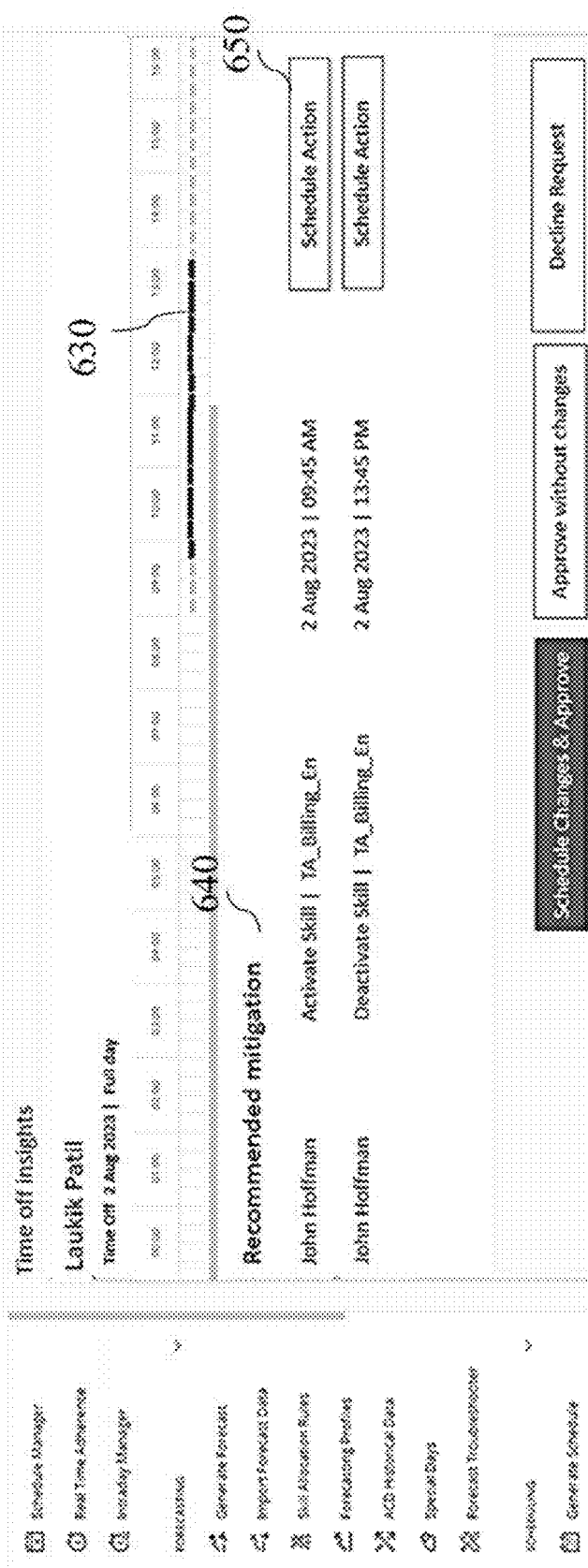

According to some embodiments of the present disclosure, an engine, such as schedule change impact analysis engine 120*b*, and such as module for managing skills in an ACD due to a request of change to a scheduled-shift of an agent 120*a* in FIG. 1A, may be implemented as a conceptual java-based service which analyzes the impact of agent time-off requests. The schedule change impact analysis engine 120*b* may receive multiple parameters as input like net staffing, list of agents with skill association and ACD-skills with SLA threshold values 115*b*. The schedule change impact analysis engine 120*b* may operate and may generate the output in the form of insights 180*b*. The insights 180*b* may be the impact of time-off on SLA level for each ACD-skill and accordingly recommendations of skill management of other agents. These insights may be integrated with a time-off request of an agent and provided to a manager. For example, as shown in FIG. 6B.

According to some embodiments of the present disclosure, the ACD application, such as ACD application 140*a* and such as ACD application 140*a* in FIG. 1A, may be any generic service capable of providing automatic contact distribution and store skill related data. The ACD application 140*b* may have data for the ACD-skills and the corresponding SLA KPI. The ACD-skills and the corresponding SLA thresholds may be used to determine if the skill may be impacted due to a request of change to a scheduled-shift of an agent, e.g., time-off request.

According to some embodiments of the present disclosure, the data structure of the ACD-skill that may be stored in the ACD application 140b may be for example, as follows:

```
{
   "Skill name": Email,
   "SLA": 90
}
```

According to some embodiments of the present disclosure, the WFM application 130b, such as WFM application 130a in FIG. 1A, may be a workforce management application with multiple integrated processes like staffing and scheduling. The WFM application 130b may act as a data store for staff data. Staffing data is used to determine the number of agents required after the time-off is applied and analyze the impact on SLA.

According to some embodiments of the present disclosure, the data structure of the staffing data may be, for example, as follows:

```
{
   "interval": "2023-01-01 05:00:00",
   "skill": "Email",
   "Required agent": 90
}
```

According to some embodiments of the present disclosure, the admin application 160b may be a generic service of a CCaaS application. It may store information of integration data of the WFM application 130b and the ACD application 140b. It may store the relation between the WFM application 130b and the ACD-skills, such as ACD-skills 145a in FIG. 1A. One WFM skill can be mapped to multiple ACD-skill. For example, the data structure may be as follows:

```
{
   "WFM skill": "Email",
   "ACD skill": [
   "Skill name": "IB email",
   "Skill name": "OB email"
   ]
}
```

According to some embodiments of the present disclosure, a manager 170b, may be a generic service, which may operate as a submodule WFM service. It may store the information of the schedule for each agent for dates. Schedule data may be used in system 100B and in system 100A in FIG. 1A, to verify the agent's availability for re-assigning the skills. For example, the format of the schedule data, may be as follows:

```
{
   "Start interval": "2023-01-01 05:00:00",
   "End interval": "2023-01-01 09:00:00",
   "agent": "Tim Cook",
   "activity": "Open"
}
```

According to some embodiments of the present disclosure, the schedule change impact analysis engine 120b may specify for which agent skill needs to be enabled or disabled to maintain the SLA metrics. The recommendations may be automatically scheduled, and skills can be activated or deactivated within the application at specified time-interval. For example, as shown in the UIs in FIGS. 6A-6B.

FIGS. 2A-2B are a high-level workflow of a module 200 for managing skills in an ACD application due to a request of change to a scheduled-shift of an agent, in accordance with some embodiments of the present disclosure.

According to some embodiments of the present disclosure, operation 210 comprising receiving the request of change to a scheduled-shift from the agent via a User Interface (UI) of a Workforce Management (WFM) application.

According to some embodiments of the present disclosure, operation 220 comprising retrieving all skills associated to the agent from the WFM application.

According to some embodiments of the present disclosure, operation 230 comprising for each skill of all skills associated to the agent, retrieving from the ACD application one or more mapped ACD-skills and a corresponding Service Level Agreement (SLA) threshold.

According to some embodiments of the present disclosure, operation 240 comprising for each time-interval of the scheduled-shift: for each ACD-skill in the one or more mapped ACD-skills: a. predicting an impact-level of the ACD-skill of the agent on the corresponding SLA threshold; b. when the predicted impact-level of the ACD-skill is positive, automatically selecting a different-agent that is assigned to the time-interval and activating the ACD-skill of the different-agent, and deactivating all other ACD-skills of the different-agent in the ACD application, for the time-interval to mitigate the ACD-skill corresponding SLA threshold, and setting the predicted impact-level of the ACD as negative. The ACD-skill of the different-agent is not mapped to a skill in the WFM application.

According to some embodiments of the present disclosure, operation 250 comprising when the predicted impact-level of each ACD-skill in each time-interval of the scheduled-shift on the SLA is negative, automatically granting the request of change to the scheduled-shift of the agent and changing the scheduled-shift of the agent that is stored in a database associated to the WFM application based on the request of change to the scheduled-shift.

According to some embodiments of the present disclosure, operation 260 comprising configuring the ACD application to route inbound-interactions to the different-agent based on the activated ACD-skill of each different-agent during the time-interval in the scheduled-shift.

Figure 3A:
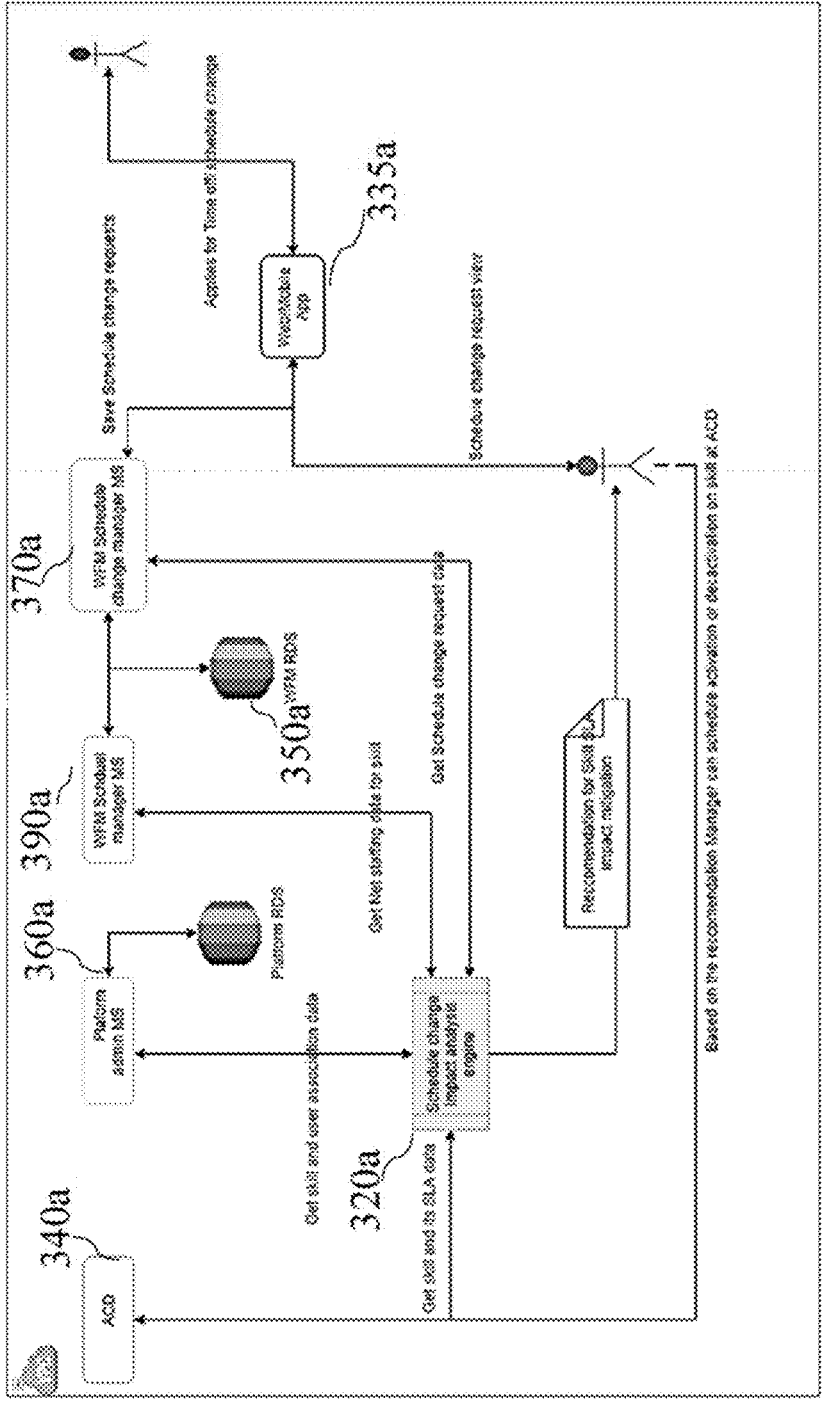
FIGS. 3A-3E are a high-level workflow of a module for managing skills in an ACD application due to a request of change to a scheduled-shift of an agent, in accordance with some embodiments of the present disclosure.

FIG. 3A is a high-level workflow 300A of a module for managing skills in an ACD application due to a request of change to a scheduled-shift of an agent, in accordance with some embodiments of the present disclosure.

According to some embodiments of the present disclosure, all the components may be deployed for example, on an AWS private network with restricted access rules. The schedule change impact analysis engine 320a, such as schedule change impact analysis engine 120b in FIG. 1B may depend on input data received from different applications, such as WFM application and CCaaS platform and ACD microservices and components which may be deployed as AWS ECS containers and using AWS Relational Database Service (RDS) as data storage.

According to some embodiments of the present disclosure, and agent may a request of change to a scheduled-shift via a UI that is associated to the WFM application that is running via the web or a mobile app 335a. the request of change may be, for example, an agent time-off request. Upon submission of the request, the schedule request manager, such as WFM schedule change manager MS 370a and such as manager 170b in FIG. 1B which may schedule change requests may store the request details in a database 350a, such as database 150a in FIG. 1A.

According to some embodiments of the present disclosure, the WFM schedule manager MS 390a may gather staffing summaries based on historical forecasted requirements, which serve as the basis for scheduling agents' work shifts.

According to some embodiments of the present disclosure, optionally, managers may review the submitted request of change to a scheduled-shift, e.g., time-off requests and operate an engine, such as schedule change impact analysis engine 120b, to gain deeper insights into potential schedule adjustments.

According to some embodiments of the present disclosure, the schedule change impact analysis engine 320a, may retrieve request details from the manager 370a, e.g., schedule change manager Microservice (MS), for example, by using Representational State Transfer (REST) Application Programming Interfaces (API) s, to gather information, such as agent name and requested date and time changes of the request of change to a scheduled-shift of the agent.

According to some embodiments of the present disclosure, the schedule change impact analysis engine 320a, may retrieve from the ACD application ACD 340a, such as ACS application 140a in FIG. 1A, agent ACD-skills and the corresponding SLA threshold.

According to some embodiments of the present disclosure, to assess the impact of the request of change to a scheduled-shift of the agent, the schedule change impact analysis engine 320a, may fetches the agent's associated skills from the platform admin MS 360a, such as admin application 160b in FIG. 1B.

According to some embodiments of the present disclosure, the schedule change impact analysis engine 320a, may retrieve staffing requirements based on the requested time-interval and the skills of the agent. Then, the schedule change impact analysis engine 320a, may process the gathered data to discern the impact of the schedule change on the skill SLAs.

According to some embodiments of the present disclosure, optionally, insights derived from the schedule change impact analysis engine 320a may be presented to the manager via an interface, accompanied by suggested actions to mitigate the impact of the schedule change.

According to some embodiments of the present disclosure, the schedule change impact analysis engine 320a may automatically execute actions to mitigate the impact of the schedule change due to the request of change to a scheduled-shift of the agent, or upon manager approval of the request. The actions may be to activate or deactivate ACD-skills from agents in the ACD application 340a during the impacted time-interval in the request, thus, ensuring minimal disruption to skill SLAs.

Figure 3B:
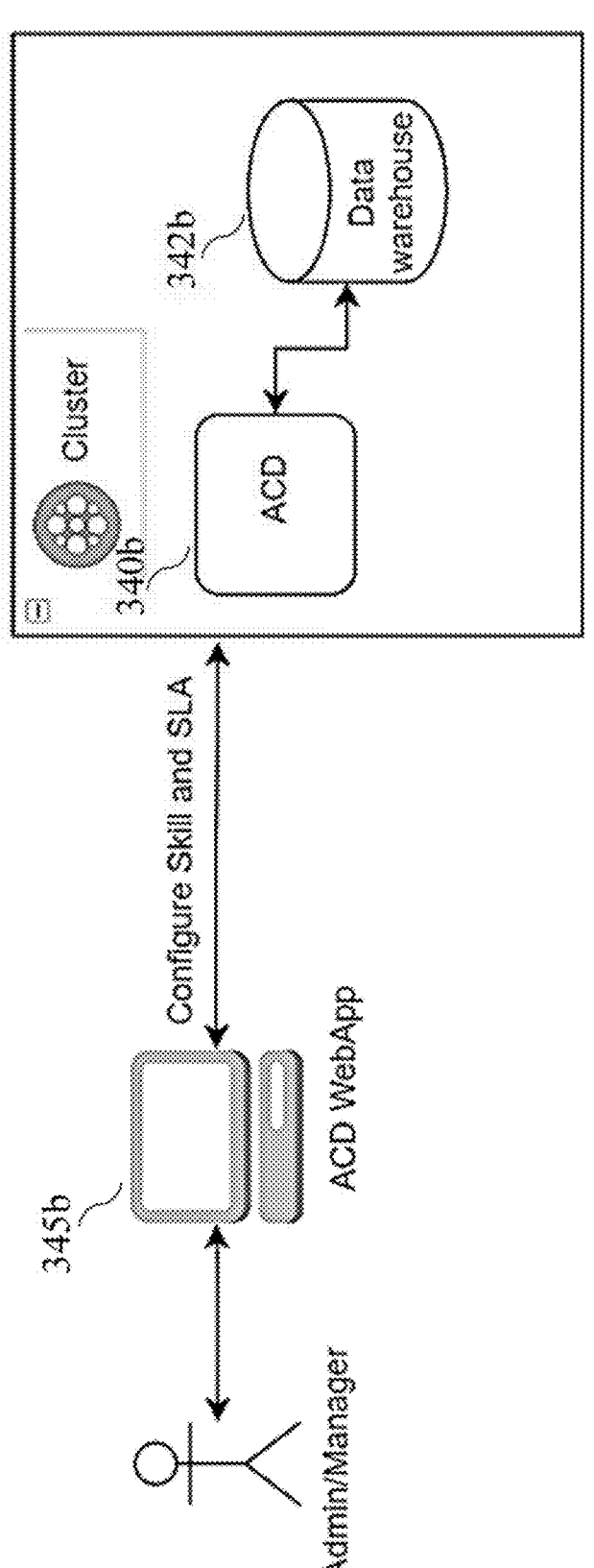

According to some embodiments of the present disclosure, the schedule change impact analysis engine 320a may automatically select a different-agent that is assigned to the time-interval and may activate the ACD-skill of the different-agent, and deactivate all other ACD-skills of the different-agent in the ACD application 340a, for the time-interval to mitigate the ACD-skill corresponding SLA threshold, and setting the predicted impact-level of the ACD as negative FIG. 3B is a high-level workflow 300B of a module for managing skills in an ACD application due to a request of change to a scheduled-shift of an agent, in accordance with some embodiments of the present disclosure.

According to some embodiments of the present disclosure, system 100A in FIG. 1A and system 100B in FIG. 1B may be implemented in a CCaaS that is a cluster-based environment in the cloud-computing environment. For each client, e.g., contact center, the CCaaS may be delivered via a private access cluster.

According to some embodiments of the present disclosure, the ACD application 340b, such as ACD application 140a in FIG. 1A and such as ACD application 140b in FIG. 1B stores information about ACD-skills, such as ACD-skills 145a in FIG. 1A and their SLAs, agent states, and different routing policies into the data warehouse host on the cluster. To integrate with the CCaaS, APIs have been exposed by the ACD application 340b.

According to some embodiments of the present disclosure, system 100A in FIG. 1A and system 100B in FIG. 1B may utilize these APIs to get ACD-skills and corresponding SLA threshold from the ACD application 340, as input and perform scheduled actions of activation or deactivation of skills using these APIs. An ACD webapp 345b may be used to configure the ACD-skills and the corresponding SLA thresholds.

Figure 3C:
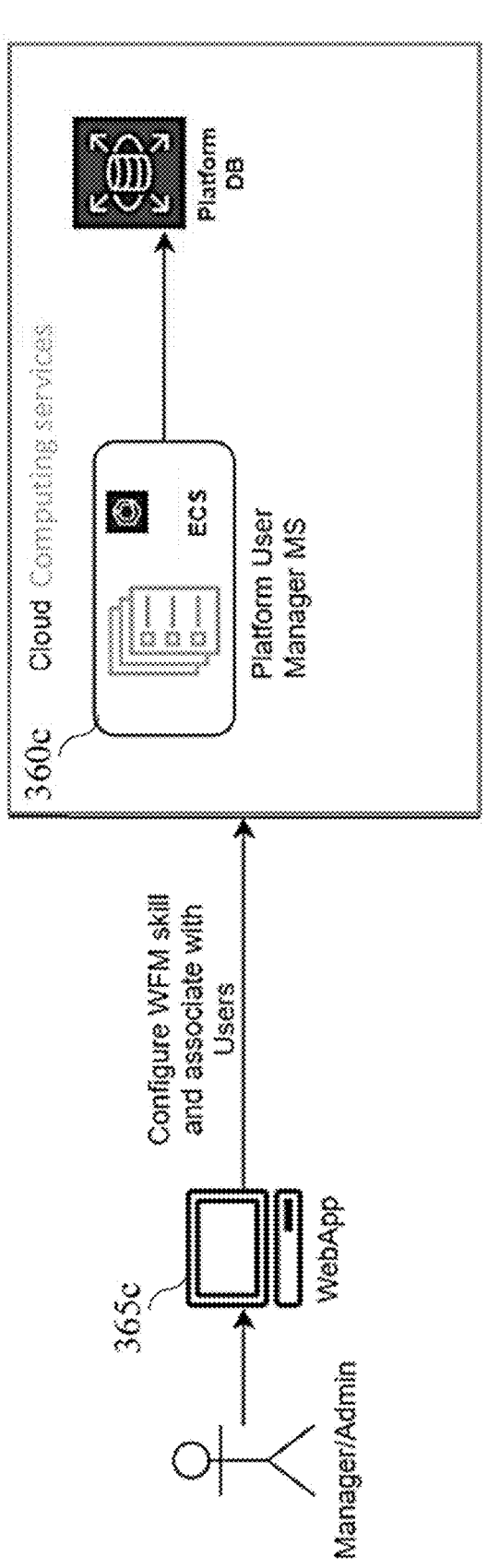

FIG. 3C is a high-level workflow 300C of a module for managing skills in an ACD application due to a request of change to a scheduled-shift of an agent, in accordance with some embodiments of the present disclosure.

According to some embodiments of the present disclosure, the platform user manager MS 360c, such as admin application 160b in FIG. 1B, may be implemented as a Java-based Spring Boot microservice (MS) operates within the cloud infrastructure, such as the AWS cloud infrastructure, leveraging Elastic Container Service (ECS) for containerized deployment. By distributing its containers across multiple availability zones, the service ensures resilience against failures by maintaining redundant instances across distinct physical locations.

According to some embodiments of the present disclosure, the platform user manager MS 360c mainly manage users. By using REST APIs exposed by it managers or admin can associate WFM skills to users via a webapp 365c by configuring the WFM skills and associate users.

According to some embodiments of the present disclosure, system 100A in FIG. 1A and system 100B in FIG. 1B may utilize these REST APIs to retrieve the agent and associated skills and when the predicted impact-level of the ACD-skill is positive, automatically select a different-agent that is assigned to the time-interval and activating the ACD-skill of the different-agent, and deactivating all other ACD-skills of the different-agent in the ACD application, for the time-interval to mitigate the ACD-skill corresponding SLA threshold, and set the predicted impact-level of the ACD as negative.

According to some embodiments of the present disclosure, system 100A in FIG. 1A and system 100B in FIG. 1B may utilize these REST APIs to retrieve the agent and associated skills and predict that impact-level of each ACD-skill in each time-interval of the scheduled-shift on the SLA and when it is negative, automatically grant the request of change to the scheduled-shift of the agent and then, change the scheduled-shift of the agent that is stored in a database associated to the WFM application based on the request of change to the scheduled-shift.

According to some embodiments of the present disclosure, optionally, insights may be derived to the manager if a particular agent's schedule change request will impact the SLA of the skill associated with the agent.

Figure 3D:
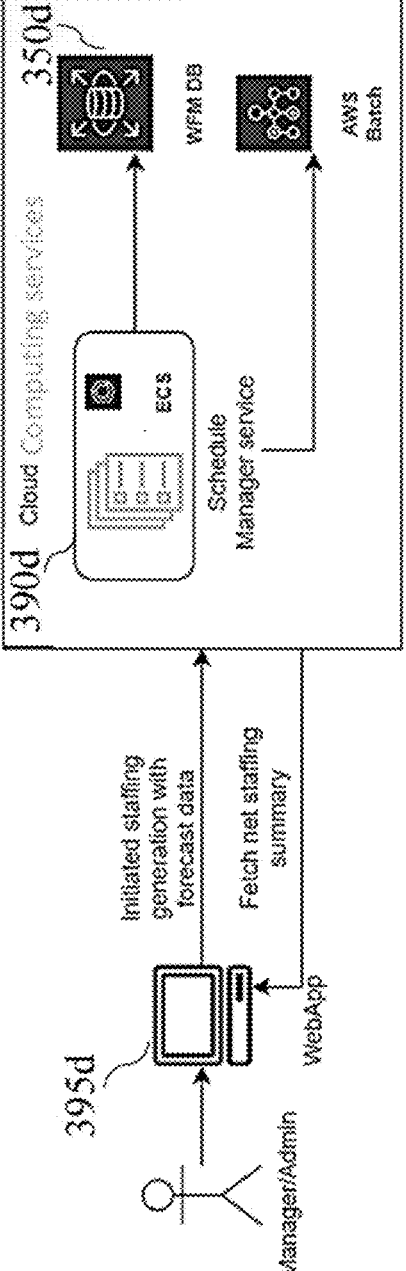

FIG. 3D is a high-level workflow 300D of a module for managing skills in an ACD application due to a request of change to a scheduled-shift of an agent, in accordance with some embodiments of the present disclosure.

According to some embodiments of the present disclosure, the schedule manager service 390d, such as WFM schedule manager MS 390a, may be implemented as a Java-based Spring Boot microservice that may operate within a cloud infrastructure, e.g., AWS cloud infrastructure, leveraging Elastic Container Service (ECS) for containerized deployment. By distributing its containers across multiple availability zones, the schedule manager service 390*d* ensures resilience against failures by maintaining redundant instances across distinct physical locations.

According to some embodiments of the present disclosure, the schedule manager service 390*d* may gather staffing summaries based on historical forecasted requirements, which serve as the basis for scheduling agents' work shifts. This involves an asynchronous process driven by user inputs, where staffing data is computed in response to forecasted demands using a cloud infrastructure batch service.

According to some embodiments of the present disclosure, the schedule manager service 390*d* may expose a comprehensive set of REST APIs, enabling users to retrieve detailed information about net staffing summaries per each time-interval. These APIs support various filters such as WFM skills, agents, and scheduling units, for querying and analysis.

According to some embodiments of the present disclosure, the schedule manager service 390*d* may interface with a schedule change impact analysis engine 320*a*. For each time-interval, the schedule change impact analysis engine 320*a* may dynamically fetch staffing requirements from the schedule manager service 390*d*, to find out the impact on ACD-skill SLA based on staffing requirements because of the request of change to a scheduled-shift of the agent.

Figure 3E:
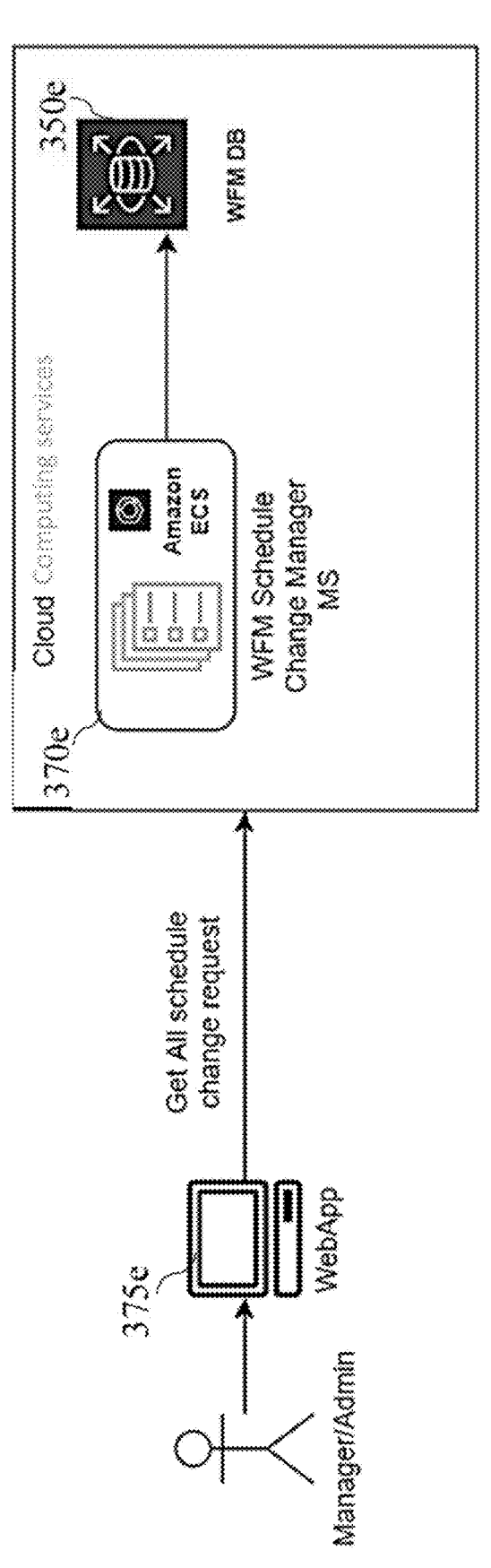

FIG. 3E is a high-level workflow 300E of a module for managing skills in an ACD application due to a request of change to a scheduled-shift of an agent, in accordance with some embodiments of the present disclosure.

According to some embodiments of the present disclosure, the WFM schedule change manager MS 370*e*, such as WFM schedule change manager MS 370*a* and such as manager 170*b* in FIG. 1B may be implemented as a Java-based Spring Boot microservice that may operate within the cloud infrastructure, e.g., AWS cloud infrastructure, leveraging the ECS for containerized deployment. By distributing its containers across multiple availability zones, the WFM schedule change manager MS 370*e* ensures resilience against failures by maintaining redundant instances across distinct physical locations.

According to some embodiments of the present disclosure, the WFM schedule change manager MS 370*e* may save and fetch schedule change requests submitted by an agent. Then, by using REST APIs the schedule change impact analysis engine 320*a* may get schedule requests and apply logic to assess the impact on the SLA of skills.

Figure 4A:
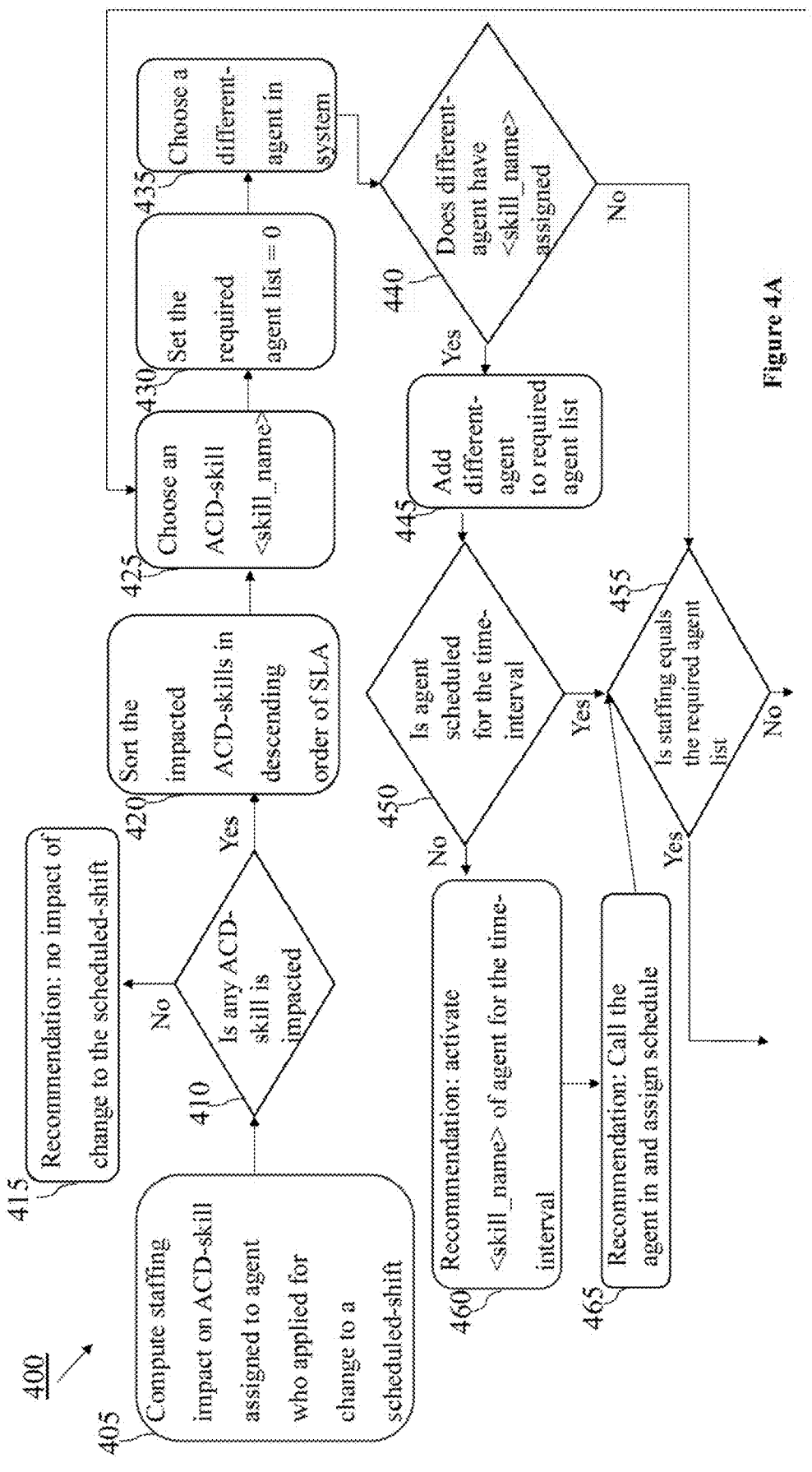
FIG. 4 is a high-level workflow of a module for managing skills in an ACD application due to a request of change to a scheduled-shift of an agent, in accordance with some embodiments of the present disclosure.
Figure 4B:
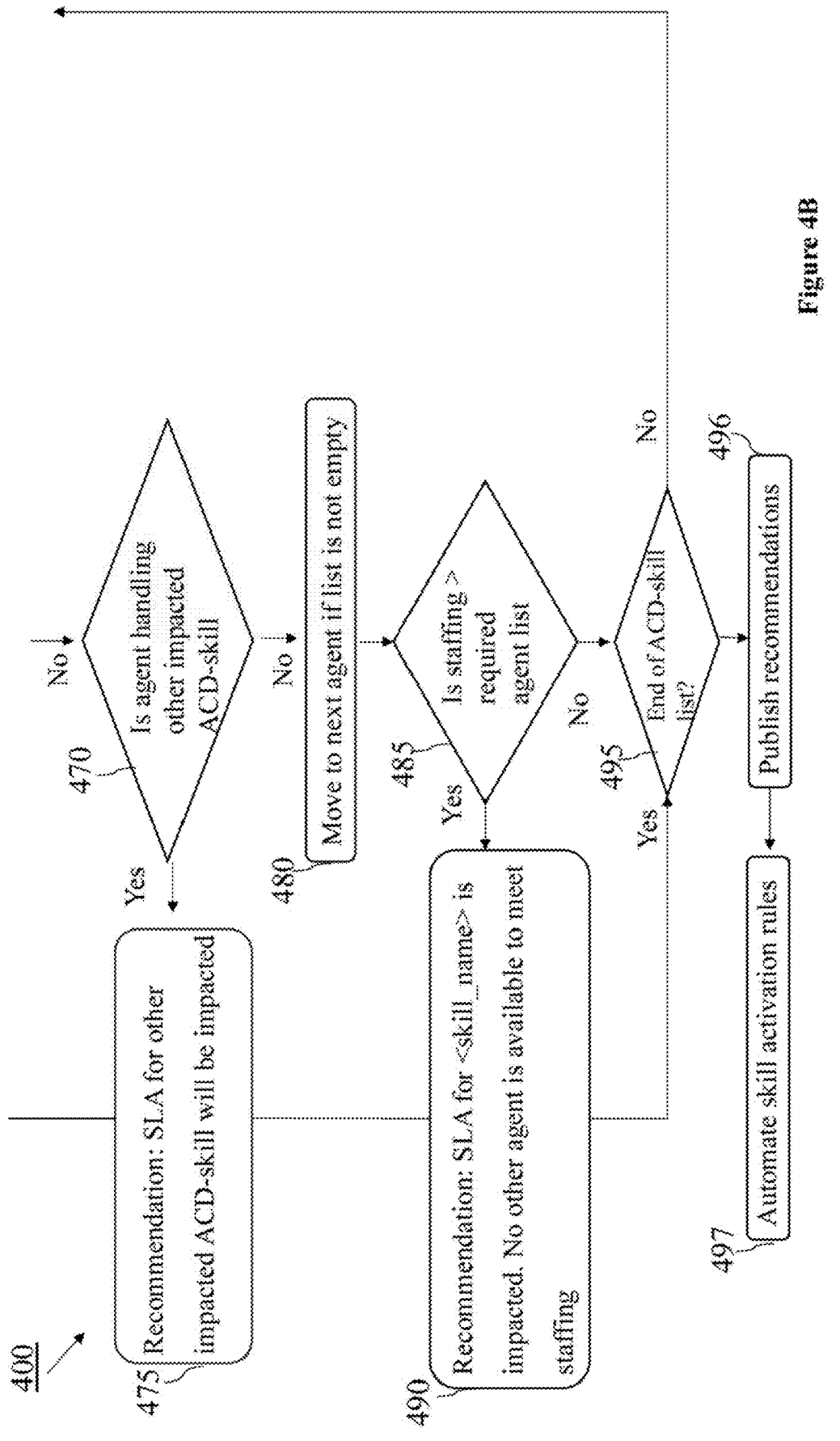

FIG. 4 is a high-level workflow 400 of a module for managing skills in an ACD application due to a request of change to a scheduled-shift of an agent, in accordance with some embodiments of the present disclosure.

According to some embodiments of the present disclosure, in a system, such as system 100A in FIG. 1A and such as system 100B in FIG. 1B, staffing data may be used to analyze if each ACD-skill of an agent, that has requested a change in a scheduled-shift, is impacted due to a request of change to a scheduled-shift of the agent by computing staffing impact on ACD-skill assigned to agent who applied for change to a scheduled-shift 405. It is also used to evaluate if corresponding SLA of the impacted ACD-skills are mitigated. After performing recommended changes, e.g., recommendations generated by schedule change impact analysis engine 120*b* in FIG. 1B, or the automatic actions, if the SLA for ACD-skills is still above threshold, then it is considered as an impacted ACD-skill.

According to some embodiments of the present disclosure, when the predicted impact-level of each ACD-skill in each time-interval of the scheduled-shift on the SLA is negative, the request of change to the scheduled-shift of the agent may be automatically granted and the scheduled-shift of the agent that is stored in a database associated to the WFM application may be changed based on the request of change to the scheduled-shift. Optionally, a notification as to the granted schedule change may be sent to the agent and presented via a UI of the WFM application, and upon click on a confirmation button, via the UI of the WFM application, the change to the scheduled-shift based on the request may be operated.

According to some embodiments of the present disclosure, in a system, such as system 100A in FIG. 1A and such as system 100B in FIG. 1B, upon receiving a request of change to a scheduled-shift from the agent, the schedule change impact analysis engine 120*b* in FIG. 1B may check if any ACD-skill is impacted 410. When there is no ACD-skill that is impacted, there may be a recommendation that there is no impact of change to the scheduled-shift 415. The recommendation may be presented via a UI of the WFM application.

According to some embodiments of the present disclosure, when there are ACD-skills which are impacted, schedule change impact analysis engine 120*b* in FIG. 1B may sort the impacted ACD-skills in descending order of SLA 420 and then choose an ACD-skill 425 and set required agent list as empty 430.

According to some embodiments of the present disclosure, schedule change impact analysis engine 120*b* in FIG. 1B may choose an agent in system 435 and then check does the agent have the ACD-skill assigned 440. The system may be any preconfigured repository of agents that is associated to the WFM application. If the agent has the ACD-skill assigned, then the schedule change impact analysis engine 120*b* in FIG. 1B may add the different-agent to required agent list 445.

According to some embodiments of the present disclosure, the schedule change impact analysis engine 120*b* in FIG. 1B, may check if the agent is scheduled for the time-interval 450. If the agent is not scheduled to the time-interval, the recommendation may be to activate the ACD-skill of the agent for the time-interval 460 and then the recommendation may be, call the agent in and assign schedule 465. Optionally, schedule change impact analysis engine 120*b* in FIG. 1B may automatically activate the ACD-skill for the time-interval and send a notification to the agent, to be presented via a UI of the WFM application.

According to some embodiments of the present disclosure, if the agent is scheduled to the time-interval, of the scheduled-shift, checking if the staffing equals the required agent list 455. When the staffing equals the required agent list checking if it is the end of ACD-skill list 495. If it is the end of the ACD-skill list, then the schedule change impact analysis engine 120*b* in FIG. 1B publish recommendations 496 and automatically may operate ACD-skill activation rules 497. The activation rules may be rules for enabling or disabling skills based on decisions made by managers or supervisors. These rules update the status of a skill to either active or inactive. The changes can take effect immediately or be scheduled for a future time.

According to some embodiments of the present disclosure, when the staffing is not equal to the required agent list, checking if the agent is handling other impacted ACD-skill 470. When the agent is handling other impacted ACD-skill then the recommendation may be SLA for other impacted ACD-skill will be impacted. For example, as shown in table 560 in FIG. 5.

According to some embodiments of the present disclosure, when the agent is not handling other impacted ACD-skill, the schedule change impact analysis engine 120b in FIG. 1B may move to next agent if the list of agents is not empty 480. Then, checking if staffing is larger than the required agent list 485. When the staffing is larger than the required agent list, the recommendation may be SLA for the ACD-skill is impacted. No other agent is available to meet staffing 490.

According to some embodiments of the present disclosure, when the staffing is not larger than the required agent list, then, checking if it is the end of ACD-skill list 495. When it is not the end of ACD-skill list, then the schedule change impact analysis engine 120b in FIG. 1B may choose an ACD-skill 425.

Figure 5:
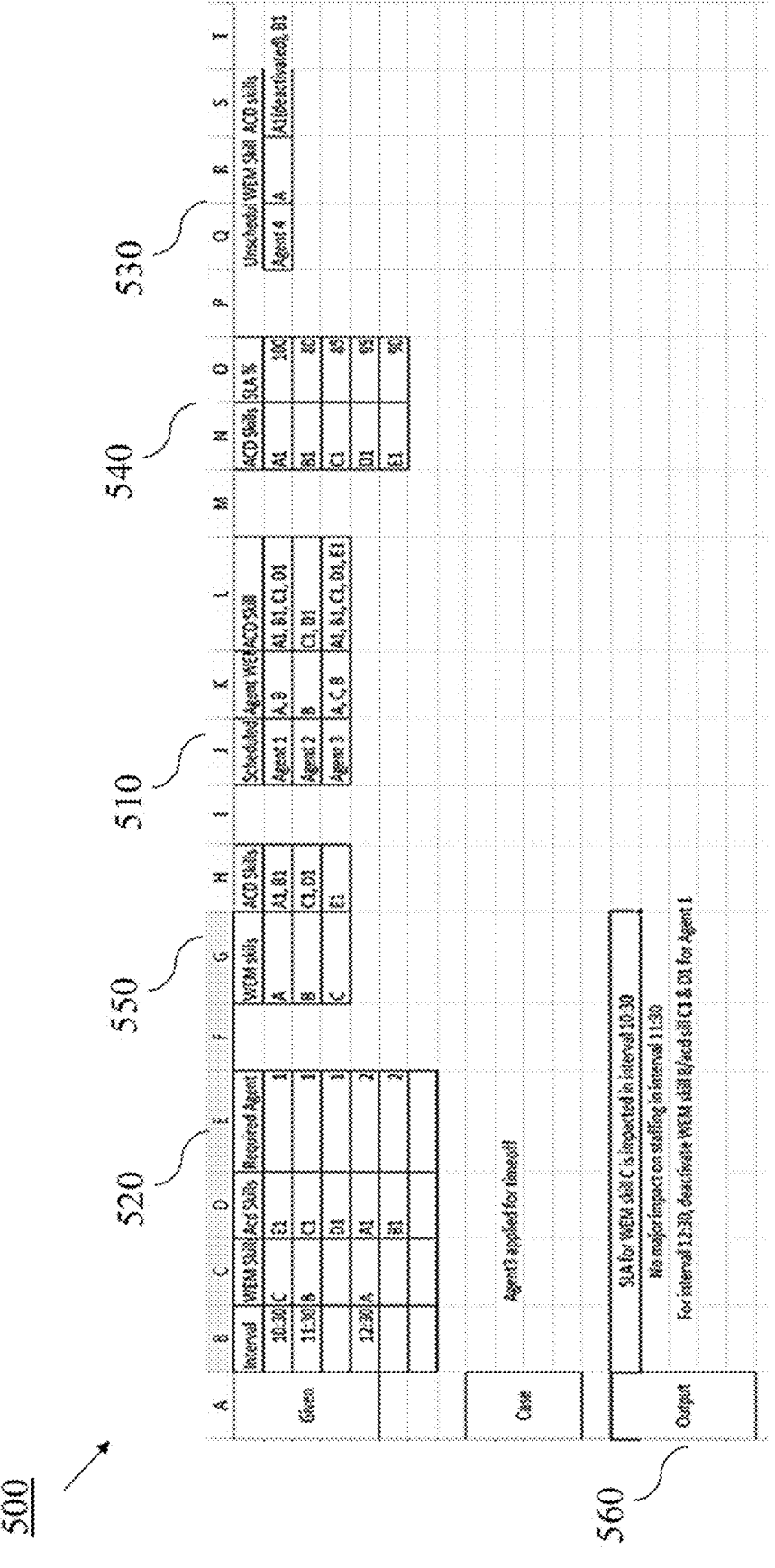
FIG. 5 is a simulation of managing skills in an ACD application due to a request of change to a scheduled-shift of an agent, in accordance with some embodiments of the present disclosure.

According to some embodiments of the present disclosure, the agent skill mapping, for example, as shown in table 510 in FIG. 5, based on table 550 in FIG. 5, may be used to analyze the availability of the agent who handles interactions of the impacted ACD-skills. If the ACD-skill is assigned to the agent but is deactivated, then the recommendation may be to activate it. Alternatively, instead of presenting the recommendation via the UI of the WFM application, the ACD-skill may be automatically activated in the ACD application.

According to some embodiments of the present disclosure, the data of the scheduled-shift may be considered, while the recommendations may be generated. If the different-agent has no schedule during the time of the scheduled-shift but has the impacted ACD-skills, it is recommended to add schedule for the different-agent. Alternatively, instead of presenting a recommendation, the schedule change impact analysis engine 120b in FIG. 1B may automatically add the schedule of the different-agent to a database that is associated to the WFM application.

According to some embodiments of the present disclosure, optionally, system 100A in FIG. 1A and system 100B in FIG. 1B may operate a schedule change impact analysis engine, such as the module for managing skills in an ACD due to a request of change to a scheduled-shift of an agent 120a in FIG. 1A and such as schedule change impact analysis engine 120b in FIG. 1B to present a list of recommendations. The list of recommendations may include for example, Activation status: "List of agents and corresponding skills that needs to be activated", Deactivation status: "List of agents and skills that needs to be deactivate", Schedule agent list: "List of agents those can be scheduled", Impacted skills: "List of the skills with impacted SLA and no skills adjustment is possible", No impact: "If the time-off request has no impact on the SLA, it is recommended accordingly".

According to some embodiments of the present disclosure, to identify the SLA impact-level of each ACD-skill of the agent that has submitted a request of change to a scheduled-shift, such as time-off request the following operations may be operated in system 100A in FIG. 1A and system 100B in FIG. 1B.

According to some embodiments of the present disclosure, fetching the WFM skill that is associated to the agent that has submitted the request, staffing plans and the related schedule of the agent from a schedule manager MS, such as schedule manager service 390d in FIG. 3D.

According to some embodiments of the present disclosure, the staffing impact of each WFM skill may be calculated by the following formula:

$$\text{New staffing}=\text{current staffing}-1.$$

According to some embodiments of the present disclosure, if there are no ACD-skills that are impacted, recommending that the request of change to a scheduled-shift can be granted to the agent. Alternatively, the request may be automatically granted.

According to some embodiments of the present disclosure, the ACD-skills that are mapped to the WFM skills may be fetched and stored in descending order by their expected SLA. This prioritization ensures that ACD-skills with more critical SLAs are addressed first. For each of the impacted ACD-skills, identifying if SLA can be met by considering all agents and their associated skills.

According to some embodiments of the present disclosure, for each impacted ACD-skill, initializing a list for staffed agents. A list may be created to keep track of agents who are currently staffed to handle the impacted ACD-skills using the list data structure.

According to some embodiments of the present disclosure, iterating through each different-agent in the list of staffed agents if the different-agent is assigned the impacted ACD-skill, add them to the list of staffed agents. Then, checking if the different-agent is assigned the ACD-skill that is impacted by the request of change to the scheduled-shift. If it is impacted, then the different-agent is added to the list of staffed agents for that ACD-skill.

According to some embodiments of the present disclosure, if the different-agent is assigned the ACD-skill that is impacted by the request and the different-agent is not scheduled, the following recommendation may be provided: "activate the ACD-skill". If the agent's ACD-skill is currently deactivated, meaning they are not available to handle calls for that ACD-skill.

According to some embodiments of the present disclosure, when the different-agent is not scheduled to work during the current time-interval, the recommendation is to call the different-agent in to cover the staffing gap. Alternatively, the different-agent may be automatically scheduled for the scheduled-shift with the ACD-skill that was deactivated and has been activated.

According to some embodiments of the present disclosure, when the number of staffed agents equals the required staffing level, recommend that the skill is not impacted and stop processing. When the number of staffed agents meets the required staffing level for the skill, the schedule change impact analysis engine 120b in FIG. 1B may conclude that the ACD-skill is adequately staffed and recommends that it is not impacted. Further processing for this ACD-skill is stopped.

According to some embodiments of the present disclosure, when the agent is handling previous skills, the schedule change impact analysis engine 120b in FIG. 1B may recommend that the skill's SLA is likely to be impacted and move to the next agent: If the agent is already handling other ACD-skills, the schedule change impact analysis engine 120b in FIG. 1B may indicate a potentially heavy workload, and the schedule change impact analysis engine 120b in FIG. 1B may recommend that the SLA for the impacted ACD-skill may be impacted as well. The schedule change impact analysis engine 120b in FIG. 1B may move to the next agent to continue evaluating staffing options.

According to some embodiments of the present disclosure, when the required staffing level is not met, schedule change impact analysis engine 120*b* in FIG. 1B may recommend that the ACD-skill is impacted. If the number of staffed agents for the ACD-skill is less than the required staffing level, the schedule change impact analysis engine 120*b* in FIG. 1B may conclude that the ACD-skill is impacted by the request of change to the scheduled-shift of the agent and may provide this recommendation. This detailed process of the schedule change impact analysis engine 120*b* in FIG. 1B ensures that the staffing impact of an agent's request is thoroughly assessed, and appropriate automatic actions or recommendations are made to maintain service levels and SLAs within the contact center environment.

FIG. 5 is a simulation 500 of managing skills in an ACD application due to a request of change to a scheduled-shift of an agent, in accordance with some embodiments of the present disclosure.

According to some embodiments of the present disclosure, a simulation of the operation of system 100A in FIG. 1A and system 100B in FIG. 1B may be for example, as shown by simulation 500. The data for the simulation 500 may be, net staffing for three WFM skills, for three different time-intervals, i.e., 10:30, 11:30, 12:30 in table 520. Workforce Engagement (WEM) skills, e.g., WFM skills and ACD-skill association in table 550. Agent and association with WFM skills and ACD-skills in table 510.

According to some embodiments of the present disclosure, agent '1' has 'A' and 'B' WFM skills and association with ACD-skills: 'A1', 'B1', 'C1', 'D1'. Table 540 specifies the expected SLA threshold for each ACD-skill. For example, for ACD-skill 'A1', SLA should be met at 100% rate, that means all calls should be attended within the specified limit. In simulation 500, three agents are scheduled for given time-intervals. Also, as shown in table 530, agent '4' is unscheduled and has 'A1' skills deactivated.

According to some embodiments of the present disclosure, given the data in tables 510-550 Agent '3', which is shown in table 510 as scheduled, has requested change to a scheduled-shift, e.g., time-off. As WFM skill A, B, C are assigned to agent '3', they are likely to be impacted.

According to some embodiments of the present disclosure, based on the operation of schedule change impact analysis engine 120*b* in FIG. 1B, the impact-level and corrective actions may be suggested, for example, as shown in table 560. For 10.30 time-interval, SLA for skill "C will be impacted. For the 11.30 time-interval there is no impact on SLA. For 12.30 time-interval it is recommended to deactivate skill 'B' for agent '1', as to meet the SLA for skill 'A'.

According to some embodiments of the present disclosure, table 540 illustrates the ACD-skills along with their corresponding SLA percentages. Agent 3 in table 510 possesses all the necessary skills and meets the staffing requirements for each time-interval. At the 10:30 time-interval, the staffing requirement is one, as shown in table 520 and the SLA for the ACD-skill is 90%, as shown in table 540. Therefore, at least one agent must be available to manage the 'E' skill contact."

FIG. 6A is a screenshot of a User Interface (UI) 600A for a request of a change to a scheduled-shift of an agent, in accordance with some embodiments of the present disclosure.

According to some embodiments of the present disclosure, the 'Activity Request' tab 610 contains currently pending time-off requests. Each row on this screen shows the user request along with request type, e.g., time-off, and details, such as date and time, and status of request. There is an option for the manager to view schedules and act on the request, i.e., approve or reject the request.

According to some embodiments of the present disclosure, via UI 600A a manager can view partial or full-day time-off requests. In this example, the agent, Laukik Patil has applied a request for scheduled-shift change for full day time-off, on 2 August. This request is pending for approval. Upon, a user's click on the insights button 620, system 100A in FIG. 1A or system 100B in FIG. 1B may be operated and then, UI 600B in FIG. 6B may be presented.

FIG. 6B is a screenshot of a UI 600B for a request of a change to a scheduled-shift of an agent, in accordance with some embodiments of the present disclosure.

According to some embodiments of the present disclosure, upon user's selection of insight button, such as button 620 in FIG. 6A the impact and recommendation for the time-off request of the agent may be presented. On click of the "insights" button 620 in FIG. 6A, the insights along with automation buttons may be presented.

According to some embodiments of the present disclosure, the bold marked time-intervals 630 indicates that the SLA would be impacted for these time-intervals while the rest of the mark indicates that the SLA remains intact even if the time-off request of the agent is approved.

According to some embodiments of the present disclosure, recommendations 640 to activate and deactivate skills for a different-agent may be presented to mitigate the impact highlighted above. Using the schedule button 650, the related actions can be scheduled to automatically occur at the given date and time.

According to some embodiments of the present disclosure, upon user selection of one of the icons, schedule changes and approve, approve without changes, and decline request, a user may act on the scheduled-shift change request.

According to some embodiments of the present disclosure, UI 600B shows that approving the time-off request for the agent "Laukik Patil" will cause some ACD-skills to go out of SLA during the time-interval from 9:45 to 13:45. At the same time, it is recommended to activate ACD-skill "TA_Billing_En" for agent "John Hoffman" for the time-interval 09:45 and deactivate ACD-skill later at 13:45 time-interval to mitigate this risk. These re-skill actions may be automatically operated at the recommended date and time.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for managing skills in an Automatic Call Distributor (ACD) application due to a request of change to a scheduled-shift of an agent, said computerized-method comprising:

(i) receiving the request of change to a scheduled-shift from the agent via a User Interface (UI) of a Workforce Management (WFM) application;

(ii) retrieving all skills associated to the agent from the WFM application;

(iii) for each skill of all skills associated to the agent, retrieving from the ACD application one or more mapped ACD-skills and a corresponding Service Level Agreement (SLA) threshold;

(iv) for each time-interval of the scheduled-shift:

for each ACD-skill in the one or more mapped ACD-skills:

a. predicting an impact-level of the ACD-skill of the agent on the corresponding SLA threshold;

b. when the predicted impact-level of the ACD-skill is positive, automatically selecting a different-agent that is assigned to the time-interval and activating the ACD-skill of the different-agent, and deactivating all other ACD-skills of the different-agent in the ACD application, for the time-interval to mitigate the ACD-skill corresponding SLA threshold, and setting the predicted impact-level of the ACD-skill as negative, wherein granting the request of change to the scheduled-shift comprises performing the mitigation without changing the scheduled-shift of the different-agent, and wherein the ACD-skill of the different-agent is not mapped to a skill in the WFM application, and wherein "mapped" is based on integration data that stores a relation between WFM skills and ACD-skills;

(v) when the predicted impact-level of each ACD-skill in each time-interval of the scheduled-shift on the SLA is negative, automatically granting the request of change to the scheduled-shift of the agent by changing the scheduled-shift of the agent that is stored in a database associated to the WFM application based on the request of change to the scheduled-shift; and (vi) configuring the ACD application to route inbound-interactions to the different-agent based on the activated ACD-skill of each different-agent during the time-interval in the scheduled-shift.

2. The computerized-method of claim 1, wherein the request of change to the scheduled-shift of the agent comprising at least one of: (i) time-off request; and (ii) shift-trade request.

3. The computerized-method of claim 1, wherein the SLA threshold is an Average Time to Answer (ATA) in a preconfigured percentage of inbound interactions.

4. The computerized-method of claim 1, wherein the predicting impact-level of the ACD-skill on the corresponding SLA threshold comprising:

(i) determining that the predicted impact-level is negative when a number of agents which are scheduled to the time-interval and assigned the ACD-skill is equal or higher than required staffing level to mitigate the corresponding SLA threshold; and (ii) determining that the impact-level is positive when the number of agents which are scheduled to the time-interval and assigned the ACD-skill is lower than required staffing level to mitigate the corresponding SLA threshold.

5. The computerized-method of claim 1, wherein when there is no different-agent that has been automatically selected to mitigate the ACD-skill corresponding SLA threshold, the request of change to the scheduled-shift of the agent is denied and said computerized-method further comprising sending a deny-notification to the agent.

6. The computerized-method of claim 1, wherein said computerized-method further comprising:

configuring the UI of the WFM application to display:

(i) the request of change to the scheduled-shift and one or more time-intervals in marked format when the predicted impact-level of at least one ACD-skill is positive;

(ii) the selected different-agent for each ACD-skill of the at least one ACD-skill that the predicted impact-level is positive; and (iii) upon receiving via the UI of the WFM a user selection of an approval icon, automatically granting the request of change to the scheduled-shift of the agent and changing the scheduled-shift of the agent that is stored in a database associated to the WFM application based on the request of change to the scheduled-shift.

7. The computerized-method of claim 1, wherein the automatically selecting of the different-agent is operated by checking each agent that is assigned to the time-interval and available if the ACD-skill is deactivated and all activated ACD-skills of the agent have negative predicted impact-level and selecting the agent as the different-agent.

8. The computerized-method of claim 1, wherein said computerized-method further comprising checking that the predicted impact-level of all other ACD-skills of the different-agent during the time-interval in the scheduled-shift is negative.

9. The computerized-method of claim 1, wherein when the predicted impact-level of the ACD-skill is positive, the computerized-method further comprising automatically selecting a different-agent that is assigned to the time-interval and activating the ACD-skill of the different-agent, and deactivating all other ACD-skills of the different-agent, which have negative impact-level, in the ACD application, for the time-interval to mitigate the ACD-skill corresponding SLA threshold, and setting the predicted impact-level of the ACD-skill as negative.

10. A computerized-system for managing skills in an Automatic Call Distributor (ACD) due to a request of change to a scheduled-shift of an agent, said computerized-system comprising:

one or more processors, said one or more processors are configured to:

(i) receive the request of change to a scheduled-shift from the agent via a User Interface (UI) of a Workforce Management (WFM) application;

(ii) retrieve all skills associated to the agent from the WFM application;

(iii) for each skill of all skills associated to the agent, retrieving from the ACD application one or more mapped ACD-skills and a corresponding Service Level Agreement (SLA) threshold;

(iv) for each time-interval of the scheduled-shift:

for each ACD-skill in the one or more mapped ACD-skills:

a. predict an impact-level of the ACD-skill of the agent on the corresponding SLA threshold;

b. when the predicted impact-level of the ACD-skill is positive, automatically selecting a different-agent that is assigned to the time-interval and activating the ACD-skill of the different-agent, and deactivating all other ACD-skills of the different-agent in the ACD application, for the time-interval to mitigate the ACD-skill corresponding SLA threshold, and setting the predicted impact-level of the ACD-skill as negative, wherein granting the request of change to the scheduled-shift comprises performing the mitigation without changing the scheduled-shift of the different-agent, and wherein the ACD-skill of the different-agent is not mapped to a skill in the WFM application, and wherein "mapped" is based on integration data that stores a relation between WFM skills and ACD-skills;

(v) when the predicted impact-level of each ACD-skill in each time-interval of the scheduled-shift on the SLA is negative, automatically granting the request of change to the scheduled-shift of the agent by changing the scheduled-shift of the agent that is stored in a database associated to the WFM application based on the request of change to the scheduled-shift; and (vi) configure the ACD application to route inbound-interactions to the different-agent based on the activated ACD-skill of each different-agent during the time-interval in the scheduled-shift.

* * * * *